Patented May 20, 1952

2,597,445

UNITED STATES PATENT OFFICE 2,597,445

N-ALKYLAMINO - METHYL - PHENYL - PROPANE AND METHOD OF PREPARING SAME

William F. Bruce, Havertown, Joseph Lester Szabo, Drexel Hill, and Samuel Tubis, Upper Darby, Pa., assignors to Wyeth Incorporated, Philadelphia, Pa., a corporation of Delaware No Drawing. Application December 23, 1948, Serial No. 67,072

4 Claims. (Cl. 260—570.5)

This invention relates to the preparation of amino compounds and more particularly relates to the preparation of specific N-alkyl amino compounds having a pharmacologic action, particularly of the sympathomimetic type.

An object of the invention is to produce novel amino compounds useful either as intermediates in the preparation of other chemical compounds or as pharmaceutical preparations having a useful physiological effect. Briefly, the invention involves the preparation of 2-(N-alkylamino)-2-methyl-1-phenyl propane and new intermediates of value for the synthesis of other compounds and of therapeutic usefulness. In order to prepare these compounds, the starting materials are benzaldehyde and 2-nitropropane which are reacted to form 2-methyl-2-nitro-1-phenyl-1-propanol. However, one may also start with 2-amino-2-methyl-1-phenyl-1-propanol which is believed to be commercially available. Assuming one starts with the aromatic aldehyde and the secondary nitroalkane, the benzaldehyde is condensed with an alkali metal salt of 2-nitropropane in the presence of $CO_2$ to form 2-methyl-2-nitro-1-phenyl-1-propanol. The nitro compound is then reduced with hydrogen to form 2-amino-2-methyl-1-phenyl-1-propanol. The latter compound is reacted with benzaldehyde to form a Shiff base. The base is alkylated, and the alkylation product is hydrolyzed. Following the hydrolysis, the reaction product is halogenated and finally the halogenated product is treated with hydrogen under hydrogenating conditions.

The alkylation reaction is carried out at an elevated temperature in the presence of an alkylating agent, as, for example, a methylating or ethylating agent. These, of course, are not the only alkylating agents one can use since the particular agent selected depends on the N-alkyl group desired in the compound. As alkylating agents suitable for the purpose here described may be mentioned lower alkyl halides as methyl or ethyl iodide or chloride, or other alkyl esters such as methyl sulfate, methyl sulfite, etc.

The product obtained from the alkylation reaction is hydrolyzed under somewhat acidic conditions, with refluxing, the hydrolysis step yielding 2-(N-alkylamino)-2-methyl-1-phenyl-1-propanol. It may be noted that, when methyl halide such as methyl iodide is used as the alkylating agent, the product obtained upon hydrolysis is 2-(N-methylamino)-2-methyl-1-phenyl-1-propanol, a useful amino compound having strong vasoconstrictor action and therefore an important therapeutic agent.

In carrying out the procedure involving the formation of a Shiff base, followed by a methylation with methyl halide and then hydrolysis, it was found that the halide salt of the addition compound was often recovered intact and there was no removal of the halide ion as is necessary for complete reaction. Thus, when using either sulfuric or phosphoric acid as the hydrolyzing agents, little or no 2-(N-methylamino)-2-methyl-1-phenyl-1-propanol was formed, contrary to normal expectations. On the other hand, when an organic acid such as acetic acid was used and, in addition, a halide-binding and buffering agent, the hydrolysis proceeded successfully, with high yields of 2-(N-methylamino)-2-methyl-1-phenyl-1-propanol.

It was found that high yields may be obtained if sodium acetate or salt of similar nature is used in the hydrolysis reaction. While sodium acetate is preferred, the salt may be any alkali or alkaline earth metal combined with a relatively weak organic acid radical. It should be capable, however, of acting as a buffering agent and as an agent for binding halide ion by reacting therewith. Furthermore, to secure high yields, a relatively large amount of organic acid shall be used in the hydrolysis step, in excess of that usually recommended for hydrolysis. It is believed that the excess of acid is necessary for solubilizing the halide reaction product. The organic acid useful for this purpose may be any one of the lower alkyl fatty acids, such as acetic acid, propionic acid, butyric acid, etc., although acetic acid has been found quite satisfactory.

Following the hydrolysis of the alkylated shiff base, the hydroxy radical may be removed by halogenation with a halogenating agent such as phosphorus and halide such as chlorine, bromine or iodine, phosphorus tri- or penta-chloride, phosphorus tribromide, thionyl bromide, or thionyl chloride. Subsequent to the halogenation step, the product is then hydrogenated in the presence of a hydrogenation catalyst in order to remove the halogen group. Hydrogenation of the 1-halo-2-(N-alkylamino)-2-methyl-1-phenyl propane produces 2-(N-alkylamino)-2-methyl-1-phenyl propane. The various steps are specifically illustrated by the following specific procedure, but it is to be understood that this is not to be taken as limitative of the invention since equivalent procedures and variations

Preparation of 2-methyl-2-nitro-1-phenyl-1-propanol 1.04 mols of NaOH are added to 80 ml. of water, and 1.00 mol of 2-nitropropane is then added with stirring until all dissolved. A rapid stream of $CO_2$ is bubbled through the solution until pH=8.5 or less is obtained. With the temperature maintained at 40-50° C., 0.96 mole of benzaldehyde is added, dropwise, with rapid stirring. Heating is continued 4 hours, and stirring and $CO_2$ stream are continued 24 hours. The resulting thick mixture is then diluted with three times its volume of water to dissolve the $NaHCO_3$ formed, and extracted three times with 20% portions of ethyl ether. The ether is shaken repeatedly with cold 25% $NaHSO_3$ to free it of unreacted benzaldehyde. The extracted ether solution is then concentrated on a steam bath, and finally freed of unreacted nitropropane by distilling the latter off under vacuum, using a water bath at 30° C., a Dry-Ice cooled receiver, and a pressure of 3-5 mm. of mercury.

The contents of the still-pot are then transferred to a beaker (heating gently to melt, if necessary), cooled in an ice-salt mixture to crystallize, filtered, and drained. Melting point of crude crystals: 57-60° C., after recrystallization from ethanol-water or petroleum ether-ethyl ether: 67° C.

Preparation of 2-amino-2-methyl-1-phenyl-1-propanol

Six gms. of nitro compound are dissolved in 50 ml. of 95% ethanol, and 20 gms. of zinc pellets (20 mesh) are added, together with a few drops of ferric chloride. Then while stirring and with the temperature maintained at 40° C., 35 ml. of 12 N. sulfuric acid are added, dropwise, during the course of 1 hour. Stirring is continued at 40° C. for six hours, then for an additional 18 hours at 20-25° C. The solution is then decanted from the zinc, made very alkaline, and extracted with ether. Concentration of the latter yielded crystals of 2-amino-2-methyl-1-phenyl-1-propanol having a melting point prior to purification of 80-89° C. Recrystallization from hot benzene raised the melting point to 99.0-99.5° C.

Preparation of 2-(N-benzalamino)-2-methyl-1-phenyl-1-propanol 12.5 g. of 2-amino-2-methyl-1-phenyl-1-propanol was dissolved in 140 cc. absolute alcohol containing 8 g. of benzaldehyde. The solution was refluxed 3.75 hours after which the alcohol was removed by evaporation under reduced pressure. The oily residue gradually crystallized and was filtered off. It was recrystallized from hot heptane and then melted at 63-65°.

Preparation of 2-(N-methylamino)-2-methyl-1-phenyl-1-propanol 15.3 g. of a solution of 2-(N-benzalamino)-2-methyl-1-phenyl-1-propanol containing about 10 g. of pure compound (the remainder being alcohol) and 9.4 g. of methyl iodide was heated in a sealed tube for 20.5 hours at 100°. On cooling the tube, the product was a nearly solid mass which was dissolved out with 25 cc. of hot acetic acid. To the acetic acid solution 15 cc. of water and 8 g. of sodium acetate were added and refluxed one hour. After this time more water was added gradually as the benzaldehyde was distilled off. The residue was extracted with ether and then made strongly alkaline when a crystalline solid precipitate of 2-(N-methylamino)-2-methyl-1-phenyl-1-propanol was obtained which when purified from benzene melts at 124-125° C.

Preparation of 1-chloro-2-(N-methylamino)-2-methyl-1-phenyl propane 0.5 g. of 2-(N-methylamino)-2-methyl-1-phenyl-1-propanol was treated with 1 cc. of thionyl chloride at room temperature. A vigorous reaction set in. The gummy material was stirred with a small amount of petroleum ether (B. 30-60°) and allowed to stand overnight. The brown crystalline solid after washing with petroleum ether was recrystallized from a small amount of absolute alcohol with addition of charcoal followed by filtration. On dilution with several volumes of ether and refrigeration white granular crystals of 1-chloro-2-(N-methamino)-2-methyl-1-phenyl propane hydrochloride were deposited.

Preparation of 2-(N-methylamino)-2-methyl-1-phenyl propane 250 mg. of 1-chloro-2-(N-methylamino)-2-methyl-1-phenyl propane hydrochloride was dissolved in 2 cc. of warm methanol and hydrogenated in the presence of 250 mg. of palladium barium carbonate catalyst with provision for the absorption of the carbon-dioxide formed. When the theoretical amount of hydrogen had been taken up the mixture was filtered to remove the catalyst, concentrated to small volume and extracted with ether. After separating the ether the residue was further concentrated yielding a white crystalline solid. This solid on solution in water, strongly alkalizing, extraction with ether and removal of the ether yielded 2-(N-methylamino)-2-methyl-1-phenyl propane identified as the picrate by melting point 155-156° and mixed melting point 154.0-4.5°, with an authentic sample melting at 150-153°.

All melting points were taken on Fisher melting point apparatus.

The amino products may be isolated, as such, or may be found more useful in the form of acid addition salts thereof. These salts may be prepared in a manner well known to those skilled in the art. As useful salts of the amino compounds may be mentioned such salts as the hydrochloride, sulphate, phosphate, tartrate, lactate, etc., which are easily prepared in a known manner.

Having described our invention, we claim:

1. As a new compound, 1-halo-2-(N-lower alkylamino)-2-methyl-1-phenyl propane wherein halo represents a halogen of the group consisting of chlorine, bromine and iodine.

2. The new compound, 1-chloro-2-(N-methylamino)-2-methyl-1-phenyl propane.

3. The process comprising reacting 2-amino-2-methyl-1-phenyl-1-propanol with benzaldehyde, alkylating the product by reaction with a lower alkyl halide, then hydrolyzing the alkylated, halide reaction product under acid solution with an aqueous solution of an organic, lower alkyl, carboxylic acid and a soluble salt of a weak organic acid selected from the group consisting of an alkali metal and alkaline earth metal salt, said salt acting as a halide-binding and buffering agent, and then halogenating the hydrolyzed product with a halogenating agent to form as the desired product 1-halo-2-(N-lower alkylamino-2-methyl-1-phenyl propane.

4. The process comprising reacting 2-amino-2-methyl-1-phenyl-1-propanol with benzaldehyde, alkylating the product by reaction with a lower alkyl halide, hydrolyzing the alkylated, halide reaction product under acid conditions with an aqueous solution of an organic, lower alkyl, carboxylic acid present in an amount sufficient to substantially solubilize the alkylated, halide reaction product, solubilizing in said solution a salt of a lower fatty acid selected from the group consisting of alkali and alkaline earth metal salts, said salt acting as a halide-binding and buffering agent, and then halogenating the hydrolyzed product with a halogenating agent to form 1-halo-2-(N-lower alkylamino)-2-methyl-1-phenyl propane.

WILLIAM F. BRUCE.
JOSEPH LESTER SZABO.
SAMUEL TUBIS.

REFERENCES CITED

The following references are of record in the file of this patent:

UNITED STATES PATENTS

| Number | Name | Date |
|---|---|---|
| 2,356,582 | Haffner | Aug. 22, 1944 |
| 2,387,873 | Boon et al. | Oct. 30, 1945 |
| 2,394,092 | Nabenhauer | Feb. 5, 1946 |
| 2,408,345 | Shelton et al. | Sept. 24, 1946 |

OTHER REFERENCES

Ser. No. 255,882, Haffner (A. P. C.), published Apr. 20, 1943.

Schmidt: "Chemical Abstracts," vol. 8, p. 3779 (1914).

Emde: "Chemical Abstracts," vol. 23, pp. 3453–3454 (1929).

Ellis: "Hydrogenation of Organic Substances," (D. Van Nostrand Co., N. Y., 3rd ed., 1930) p. 301.

Mannich et al.: "Chemical Abstracts," vol. 27, p. 3705 (1933).

Weston et al.: "J. Am. Chem. Soc.," vol. 65, pp. 674–677 (1943).